United States Patent
Pham

(10) Patent No.: US 7,725,896 B2
(45) Date of Patent: May 25, 2010

(54) PERIODIC EVENT EXECUTION CONTROL MECHANISM

(75) Inventor: Tiet Pham, Irvine, CA (US)

(73) Assignee: ADC DSL Systems, Inc., Eden Prairie, MN (US)

( * ) Notice: Subject to any disclaimer, the term of this patent is extended or adjusted under 35 U.S.C. 154(b) by 1415 days.

(21) Appl. No.: 10/624,165

(22) Filed: Jul. 21, 2003

(65) Prior Publication Data

US 2005/0022197 A1   Jan. 27, 2005

(51) Int. Cl.
  *G06F 9/46*   (2006.01)
  *G06F 11/00*  (2006.01)
  *G06F 13/24*  (2006.01)

(52) U.S. Cl. .................. 718/102; 718/106; 718/107; 710/260; 710/261; 370/230

(58) Field of Classification Search ......... 718/100–108; 710/206–261; 707/104.1; 370/230
See application file for complete search history.

(56) References Cited

U.S. PATENT DOCUMENTS

| | | | | |
|---|---|---|---|---|
| 5,379,421 A | * | 1/1995 | Palazzi et al. ............ | 707/104.1 |
| 5,944,778 A | * | 8/1999 | Takeuchi et al. ............ | 718/100 |
| 6,272,515 B1 | * | 8/2001 | Fouquet ....................... | 718/101 |
| 6,918,115 B2 | * | 7/2005 | Vargas et al. ................. | 718/102 |
| 7,039,012 B2 | * | 5/2006 | Nakano et al. ............... | 370/230 |
| 2002/0184288 A1 | * | 12/2002 | Vargas et al. ................. | 709/100 |
| 2003/0217093 A1 | * | 11/2003 | Dailey ......................... | 709/107 |
| 2004/0158832 A1 | * | 8/2004 | Chechik et al. .............. | 718/102 |

* cited by examiner

*Primary Examiner*—Meng-Ai An
*Assistant Examiner*—Jennifer N To
(74) *Attorney, Agent, or Firm*—Fogg & Powers LLC

(57) ABSTRACT

A scheduler schedules a plurality of periodic events. Each periodic event has an associated periodic interval of time and an associated set of services. The scheduler determines when one of the plurality of periodic events occurs and distributes the execution of the services associated with that periodic event during a next periodic interval of time associated with that periodic event following the occurrence of that periodic event. The services can be enabled and disabled. This allows the services to be executed, for example, in one-shot, burst, and continuous modes.

15 Claims, 7 Drawing Sheets

US 7,725,896 B2

PERIODIC EVENT EXECUTION CONTROL MECHANISM

TECHNICAL FIELD

The following description relates to event scheduling in a software system and more particularly to scheduling periodic events.

BACKGROUND

It is common in software systems, especially software systems that control the operation of external hardware (referred to here as "control systems" or "control applications", to perform certain processing (referred to here as "services") at periodic intervals (also referred to here as "periodic events") that occur after such periodic intervals elapse. Typically, a different set of services is executed for each different type of periodic event. The periodic interval of time associated with each periodic event is typically defined as a number of clock ticks. A clock tick is a signal or other indication that a predetermined base interval of time (for example, 100 milliseconds) has elapsed since the last clock tick elapsed.

For example, in one approach, a clock or timer sends an interrupt after each clock tick. An interrupt handler executes a periodic event scheduler. The periodic event scheduler determines which services should be executed in response to that clock tick. For example, in one example, a first set of services is executed after every tick (where a tick is generated every 100 milliseconds), while a second set of services is executed every second (that is, every 10 clock ticks). The periodic event scheduler maintains a counter for the second set of services to count the number of ticks that have occurred since the second set of services was last executed. This is done to determine when one second (the period for this type of periodic event) has elapsed since the second set of services was last executed.

In such an example, when an interrupt is generated to signal that a tick has elapsed, an interrupt handler executes the periodic event scheduler. The periodic event scheduler determines that the first set of services is to be executed (because the first set is executed for every tick). The periodic event scheduler initiates execution of all the services in the first set at the beginning of the current 100 millisecond period. If the counter indicates that a second has elapsed since the second set of services was last executed, the periodic event scheduler initiates execution of all the services in the second set, also at the beginning of the current 100 millisecond period.

In this example, the workload involved in executing the services will be bursty, with a burst of processing activity occurring at the beginning of each one-second interval when the execution of both the first and second sets of services is initiated. When the system is loaded while executing such a burst of periodic events is executing, system performance for other processes may be degraded. Moreover, if multiple services in a single burst exercise the same item of hardware, a power consumption surge may result.

SUMMARY

In one embodiment, a method schedules a plurality of periodic events. Each periodic event has an associated periodic interval of time and an associated set of services. The method includes determining when one of the plurality of periodic events occurs and distributing the execution of the services associated with that periodic event during a next periodic interval of time associated with that periodic event following the occurrence of that periodic event.

In another embodiment, a system includes a periodic event scheduler that schedules a plurality of periodic events. Each periodic event has an associated periodic interval of time and an associated set of services. The system also includes a tick generator that generates interrupts in response to clock ticks and an interrupt handler that receives the interrupts from the tick generator and executes the periodic event scheduler in response to the interrupt. The periodic event scheduler determines when one of the plurality of periodic events occurs and distributes the execution of the services associated with that periodic event during a next periodic interval of time associated with that periodic event following the occurrence of that periodic event.

In another embodiment, a telecommunication device includes an interface that couples the telecommunication device to a communication medium and a tick generator that generates interrupts in response to clock ticks. The device also includes control logic coupled to the interface that determines when one of a plurality of periodic events occurs. Each periodic event has an associated periodic interval of time and an associated set of services. The control logic also distributes the execution of the services associated with that periodic event during a next periodic interval of time associated with that periodic event following the occurrence of that periodic event.

The details of one or more embodiments of the claimed invention are set forth in the accompanying drawings and the description below. Other features and advantages will become apparent from the description, the drawings, and the claims.

DRAWINGS

Like reference numbers and designations in the various drawings indicate like elements.

DETAILED DESCRIPTION

Figure 1:
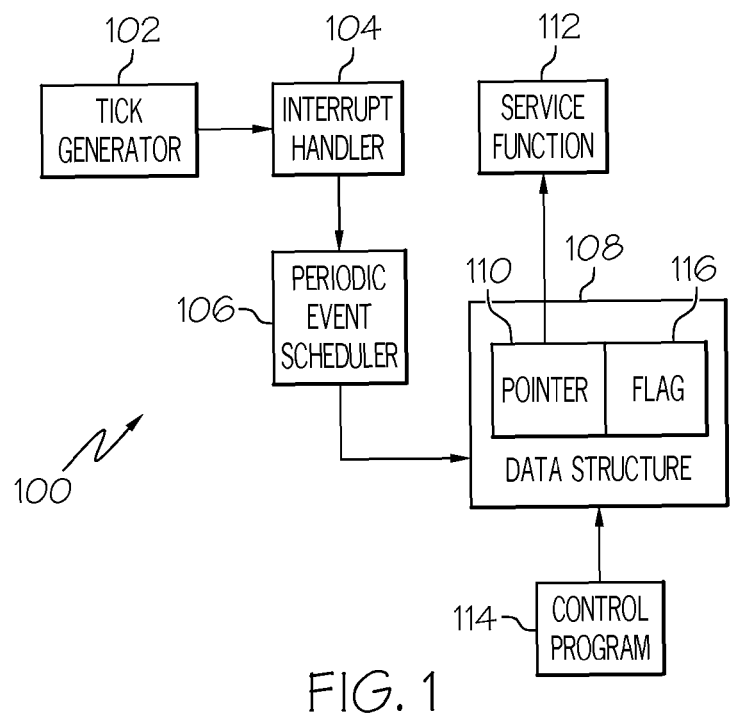
FIG. 1 is a block diagram of a system in which periodic events are scheduled and executed.

FIG. 1 is a block diagram of a system 100 in which periodic events are scheduled and executed. The system 100 includes a tick generator 102 (for example, a clock or timer) that determines when a periodic interval has elapsed (referred to here as a "clock tick" or "tick"). For example, in one embodiment, a tick occurs every 100 milliseconds. When each tick occurs, an interrupt is generated and sent to an interrupt handler 104. The interrupt handler 104 receives the interrupt and executes a periodic event scheduler 106. The periodic event scheduler determines which periodic events have occurred and which services are to be executed in response to such periodic events.

The periodic event scheduler 106 accesses a data structure 108 that includes data related to each periodic event (and its associated services) that the periodic event scheduler schedules. In particular, for each service scheduled and executed by the scheduler 106 as described here, a pointer 110 (or other reference) to a function 112 is stored in the data structure 108. The function 112 is called (that is, executed) by the periodic scheduler 106 in order to execute the associated service.

A control program 114 also accesses the data structure 108 in order to control the operation of the periodic event scheduler 106. For example, for each service scheduled and executed by the scheduler 106, a flag 116 is stored in the data structure 108. The flag 116 indicates whether the associated service should be executed when the periodic event associated with that service occurs. This allows the control program 114 to turn on and off services. This allows the control program 114 to operate services in different modes. One mode is a one-shot mode in which the service is enabled for execution one time and then is disabled. Another mode is a burst mode in which the service is enable for execution a predetermined number of times and then is disabled. Another mode is a continuous mode in which the service is enable and allowed to be executed continuously.

The system 100 is, in one embodiment, implemented by programming one or more programmable processors (or similar devices) to execute program instructions that carry out the functionality described here. The programmable processor is coupled to one or more memory devices in which such program instructions and associated data structures are stored in and retrieved from by the programmable processor.

Figure 2:
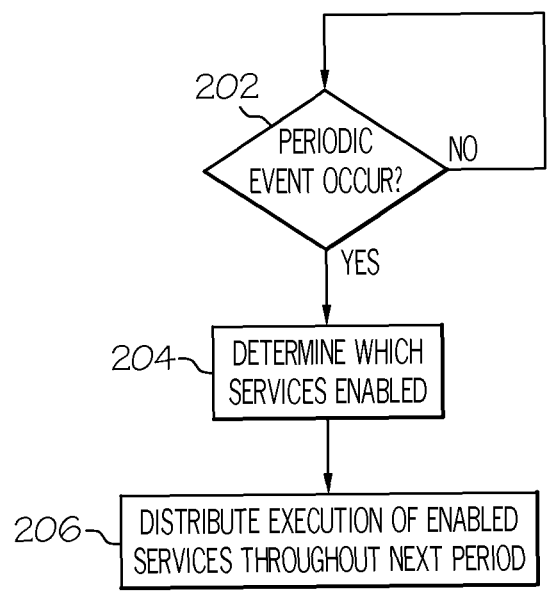
FIG. 2 is a flow diagram of one embodiment of a method of scheduling periodic events

FIG. 2 is a flow diagram of one embodiment of a method 200 of scheduling periodic events. Embodiments of method 200 are suitable for use in embodiments of the periodic event scheduler 106 shown in FIG. 1. Method 200 includes determining when a periodic event occurs (block 202). Each periodic event has an associated periodic interval of time. The periodic event occurs when each such interval of time elapses. The next periodic interval of time following the occurrence of that periodic event (that is, following the end of the previous interval of time) is referred to here as the "next period." Moreover, each periodic event has a set of services associated with that periodic event. Each of the services can either be enabled—meaning that when the periodic event occurs, the service is to be executed—or disabled—meaning that when the periodic event occurs the service is not to be executed.

When a periodic event occurs, it is determined, for each of a set of services associated with that periodic event, if that service is enabled for execution (block 204). Then, the execution of the enabled services associated with the periodic event is distributed throughout the next period associated with that type periodic event (block 206). Distributing the execution of the enabled services throughout the next period, in one embodiment, includes executing successive enabled services on successive clock ticks following the clock tick on which the periodic event occurred.

Figure 3:
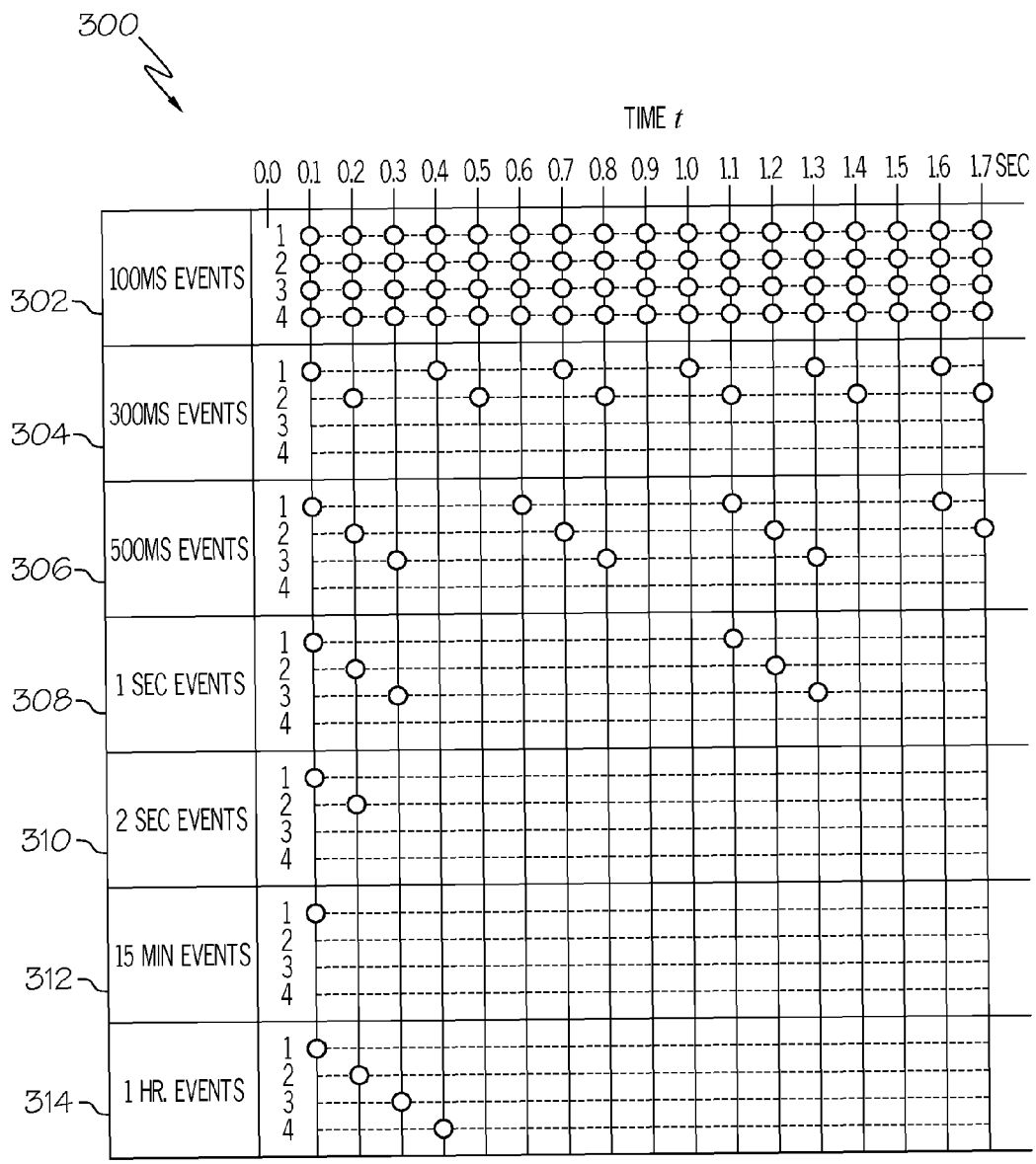
FIG. 3 is a chart illustrating one example of the operation of one embodiment of the method shown in FIG. 2.

FIG. 3 is a chart 300 illustrating one example of the operation of one embodiment of the method 200 shown in FIG. 2. In the example shown in FIG. 3, time is shown horizontally in 100 millisecond intervals. In this example, a clock tick is generated every 100 milliseconds. In the example shown in FIG. 3, the various services that are executed in response to various periodic events are shown vertically in FIG. 3. In this example, there are seven types of periodic events. Each type of periodic event has a set of services associated with that type of periodic event. Each set of services includes up to 4 services (shown by the four dashed lines 1 through 4 in each row of FIG. 3).

One type of periodic event shown in FIG. 3 is a 100-millisecond periodic event that occurs every 100 milliseconds (that is, every clock tick). Associated with the 100-millisecond periodic event is a set of four services (shown in row 302 of FIG. 3). The four services are executed after every tick (shown by the dots along dashed lines 1 through 4 in row 302).

A second type of periodic event is a 300-millisecond periodic event that occurs every 300 milliseconds (that is, every 3 clock ticks). Associated with the 300-millisecond periodic event is a set of two services (shown in row 304 of FIG. 3). When a 300-millisecond periodic event occurs, the execution of the associated services is distributed within the next 300-millisecond period following that 300-millisecond periodic event. For example, in the example shown in FIG. 3, when a 300-millisecond periodic event occurs (at time t=0.0, t=0.3, t=0.6, t=0.9, t=1.2, and t=1.5 seconds), one service is executed during the first tick in the next period (shown by the dots along dashed line 1 in row 304 at time t=0.1, t=0.4, t=0.7, t=1.0, t=1.3, and t=1.6 seconds) and the other service is executed during the second tick in the next period (shown by the dots along dashed line 2 in row 304 at time t=0.2, t=0.5, t=0.8, t=1.1, t=1.4, and t=1.7 seconds).

A third type of periodic event is a 500-millisecond periodic event that occurs every 500 milliseconds (that is, every 5 clock ticks). Associated with the 500-millisecond periodic event is a set of three services (shown in row 306 of FIG. 3). When a 500-millisecond periodic event occurs, the execution of the associated services is distributed within the next 500-millisecond period following that 500-millisecond periodic event. For example, in the example shown in FIG. 3, when a 500-millisecond periodic event occurs (at time t=0.0, t=0.5, t=1.0, and t=1.5 seconds), one service is executed during the first tick in the next period (shown by the dots along dashed line 1 in row 306 at time t=0.1, t=0.6, t=1.1, and t=1.6 seconds), a second service is executed during the second tick in the next period (shown by the dots along dashed line 2 in row 306 at time t=0.2, t=0.7, t=1.2, and t=1.7), and a third service is executed during the third tick in the next period (shown by the dots along dashed line 3 in row 306 at time t=0.3, t=0.8, and t=1.3).

A fourth type of periodic event is a 1-second periodic event that occurs every second (that is, every 10 clock ticks). Associated with the 1-second periodic event is a set of three services (shown in row 308 of FIG. 3). When a 1-second periodic event occurs, the execution of the associated services is distributed within the next 1-second period following that 1-second periodic event. For example, in the example shown in FIG. 3, when a 1-second periodic event occurs (at time t=0.0, and t=1.0), one service is executed during the first tick in the next period (shown by the dots along dashed line 1 in row 308 at time t=0.1 and t=1.1 seconds), a second service is executed during the second tick in the next period (shown by the dots along dashed line 2 in row 308 at time t=0.2 and t=1.2 seconds), and a third service is executed during the third tick in the next period (shown by the dots along dashed line 3 in row 308 at time t=0.3 and t=1.3 seconds).

A fifth type of periodic event is a 2-second periodic event that occurs every two seconds (that is, every 20 clock ticks). Associated with the 2-second periodic event is a set of two services (shown in row 310 of FIG. 3). When a 2-second periodic event occurs, the execution of the associated services is distributed within the next 2-second period following that 2-second periodic event. For example, in the example shown in FIG. 3, when a 2-second periodic event occurs (at time t=0.0 seconds), one service is executed during the first tick in the next period (shown by the dot along dashed line 1 in row 310 at time t=0.1 seconds) and the other service is executed during the second tick in the next period (shown by the dot along dashed line 2 in row 310 at time t=0.2 seconds).

A sixth type of periodic event is a 15-minute periodic event that occurs every 15 minutes (that is, every 9000 clock ticks). Associated with the 15-minute periodic event is a set of one service (shown in row 312 of FIG. 3). When a 15-minute periodic event occurs, the execution of the associated services is distributed during the next 15-minute period following that 15-minute periodic event. For example, in the example shown in FIG. 3, when a 2-second periodic event occurs (at time t=0.0 seconds), the one service is executed during the first tick in the next period (shown by the dot along dashed line 1 in row 312 at time t=0.1 seconds).

A seventh type of periodic event is a 1-hour periodic event that occurs every hour (that is, every 36000 clock ticks). Associated with the 1-hour periodic event is a set of four services (shown in row 314 of FIG. 3). When a 1-hour periodic event occurs, the execution of the associated services is distributed within the next 1-hour period following that 1-hour periodic event. For example, in the example shown in FIG. 3, when a 1-hour periodic event occurs (at time t=0.0), one service is executed during the first tick in the next period (shown by the dot along dashed line 1 in row 314 at time t=0.1 seconds), a second service is executed during the second tick in the next period (shown by the dot along dashed line 2 in row 314 at time t=0.2 seconds), a third service is executed during the third tick in the next period (shown by the dot along dashed line 3 in row 314 at time t=0.3 seconds), and a fourth service is executed during the fourth tick in the next period (shown by the dot along dashed line 4 in row 314 at time t=0.4).

Figure 4A:
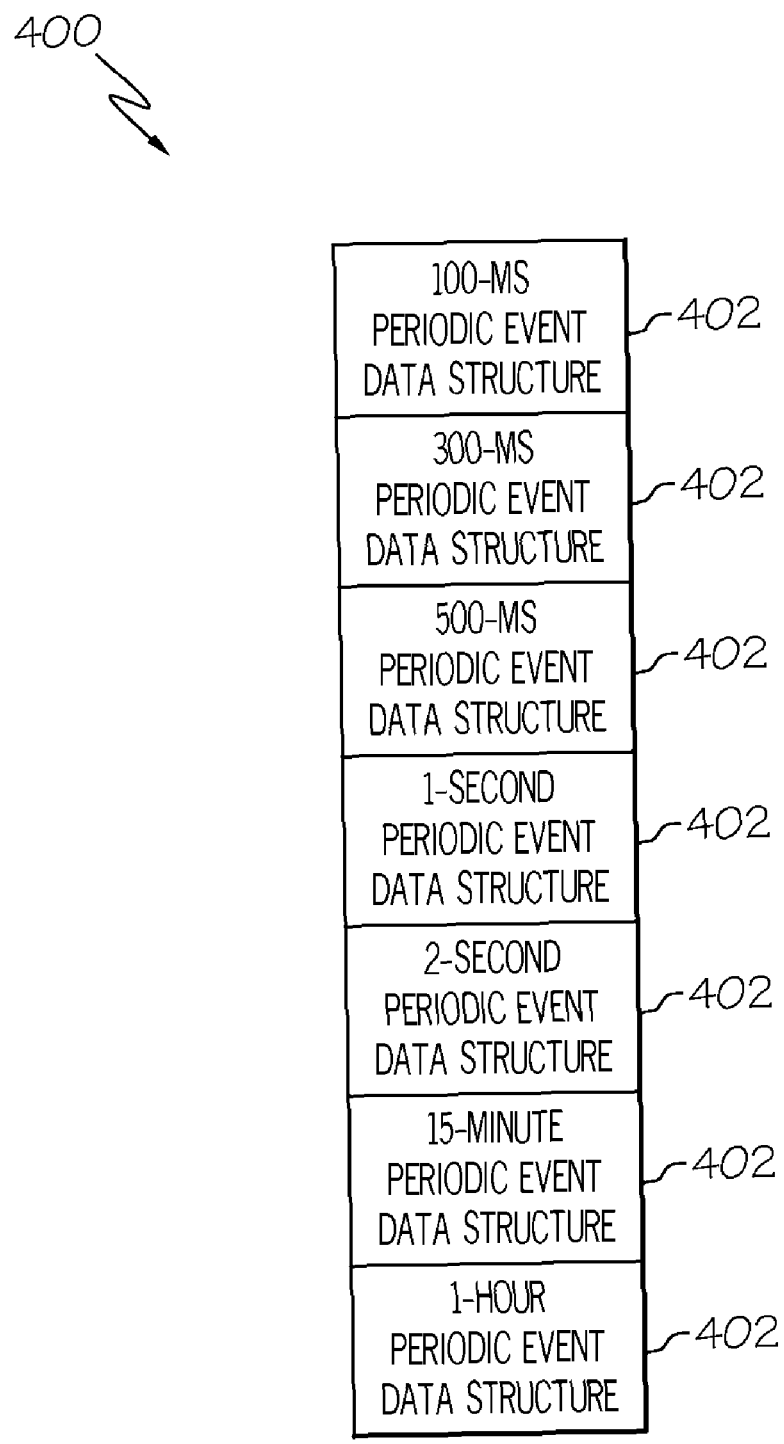
FIGS. 4A-4B are block diagrams illustrating one embodiment of data structures suitable for implementing one embodiment of a method scheduling periodic events.
Figure 4B:
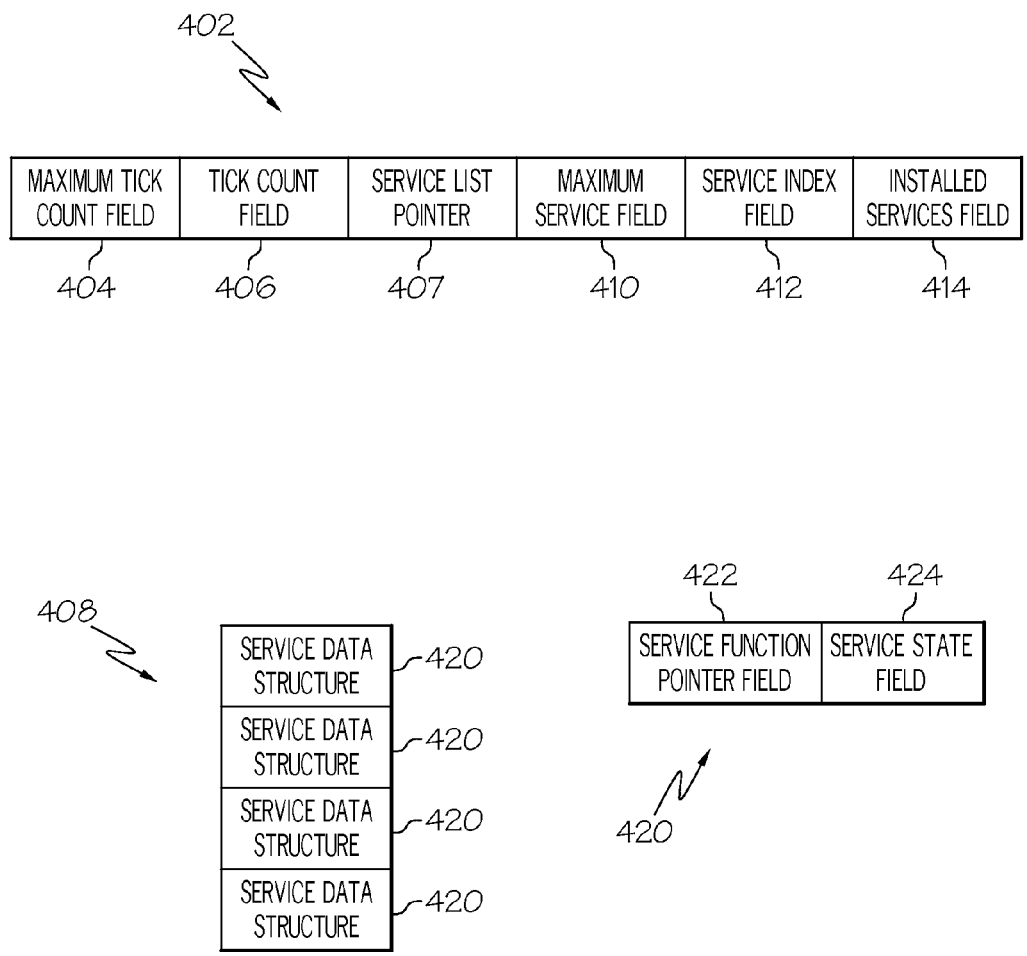

FIGS. 4A-4B are block diagrams illustrating one embodiment of data structures suitable for implementing one embodiment of a method scheduling periodic events. One embodiment of a periodic event list data structure 400 (also referred to here as a "periodic event list" or a "periodic event list array") is shown in FIG. 4A. The periodic event list 400 is an array of periodic event data structures 402. A periodic event data structure 402 is included in the periodic event list 400 for each type of periodic event that is handled by periodic event scheduler. For example, the embodiment of the periodic event list 400 shown in FIG. 4A is used to store periodic event data structures 402 for each type of periodic event shown in FIG. 3.

The format of the periodic event data structure 402 is shown in FIG. 4B. The periodic event data structure 402 includes a maximum tick count field 404 and a tick count field 406. These fields are used to determine if the services referenced by this data structure 402 are to be executed during the current tick. This is done, as is described below, by counting ticks using the tick count field 406. The periodic event data structure 402 also includes a pointer 407 (or other reference) to a service list data structure 408 (also referred to here as a "service list array" or "service list"). The service list 408 is used to store a list of service data structures 420.

The periodic event data structure 402 also includes a maximum services field 410, a service index field 412, and an installed services field 414. The maximum services field 410 is used to store a number indicating the maximum number of services that is supported for the type of periodic event associated with that periodic event data structure 402. In one embodiment, this value is set at compile time. In other embodiments, this value is set dynamically at run-time. The service index field 412 is used to store an index (or other reference) that refers to a "next" service data structure 420 stored in the service list 408. The installed services field 418 is used to store the number of services that are currently installed, which cannot exceed the value stored in the maximum services field 410. That is, the installed services field 418 contains the number of service data structures 420 that are stored in the service list 408.

The service data structure 420 includes a service function pointer field 422 and a service state field 424. The service function pointer field 422 is used to store a pointer (or other reference) to a procedure or object that is executed when the service associated with that service data structure 420 is executed. The service state field 424 is used to store a flag that indicates whether or not the service referenced by this data structure 420 should be executed or not by the periodic event scheduler. If the flag indicates that the referenced service is not to be executed, the periodic event scheduler does not execute the service referenced by that service data structure 420. For example, a control program can access this service state field 424 to store an appropriate field in order to disable or enable the execution of the referenced service.

Figure 5A:
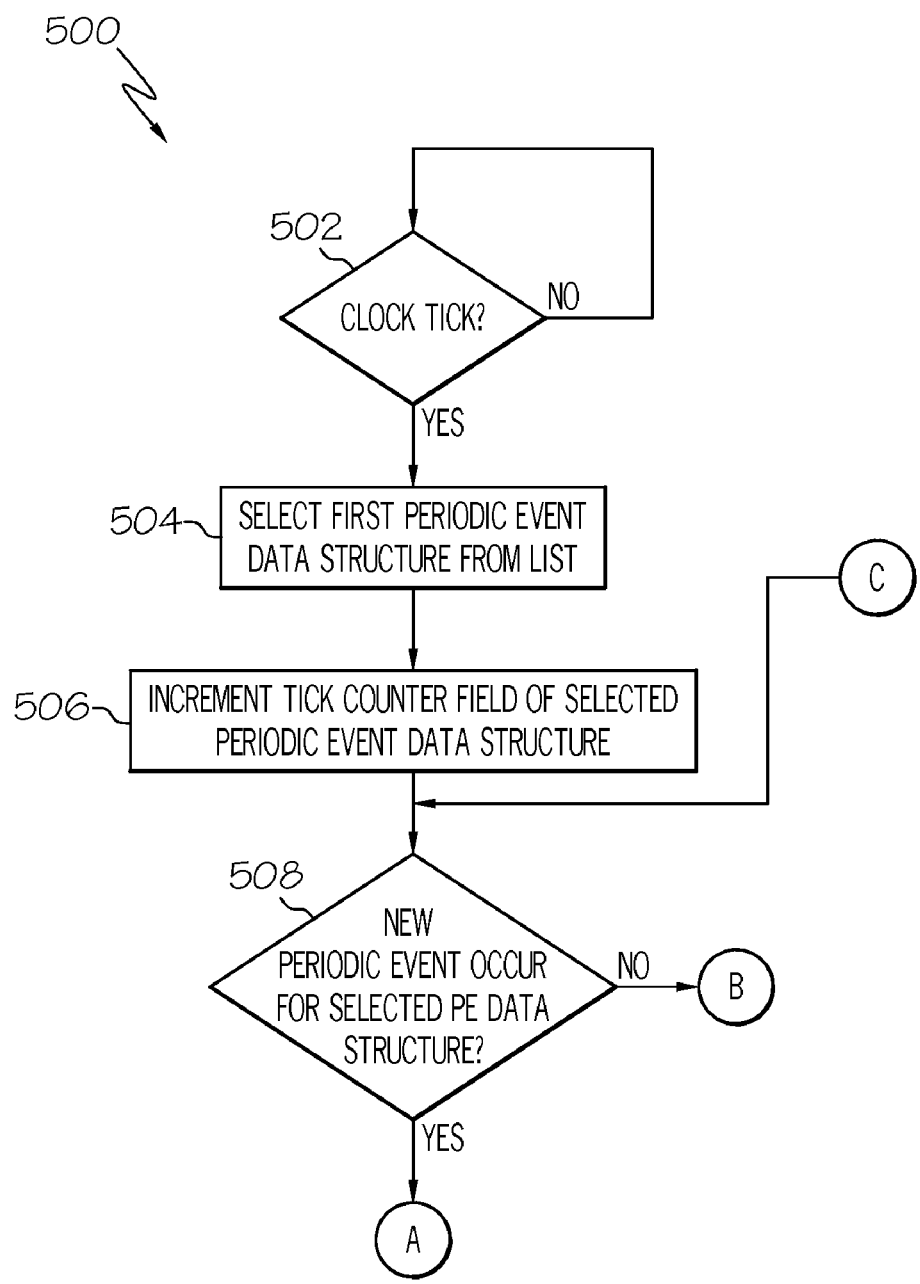
FIGS. 5A-5B show a flow diagram of one embodiment of a method of scheduling periodic events.
Figure 5B:
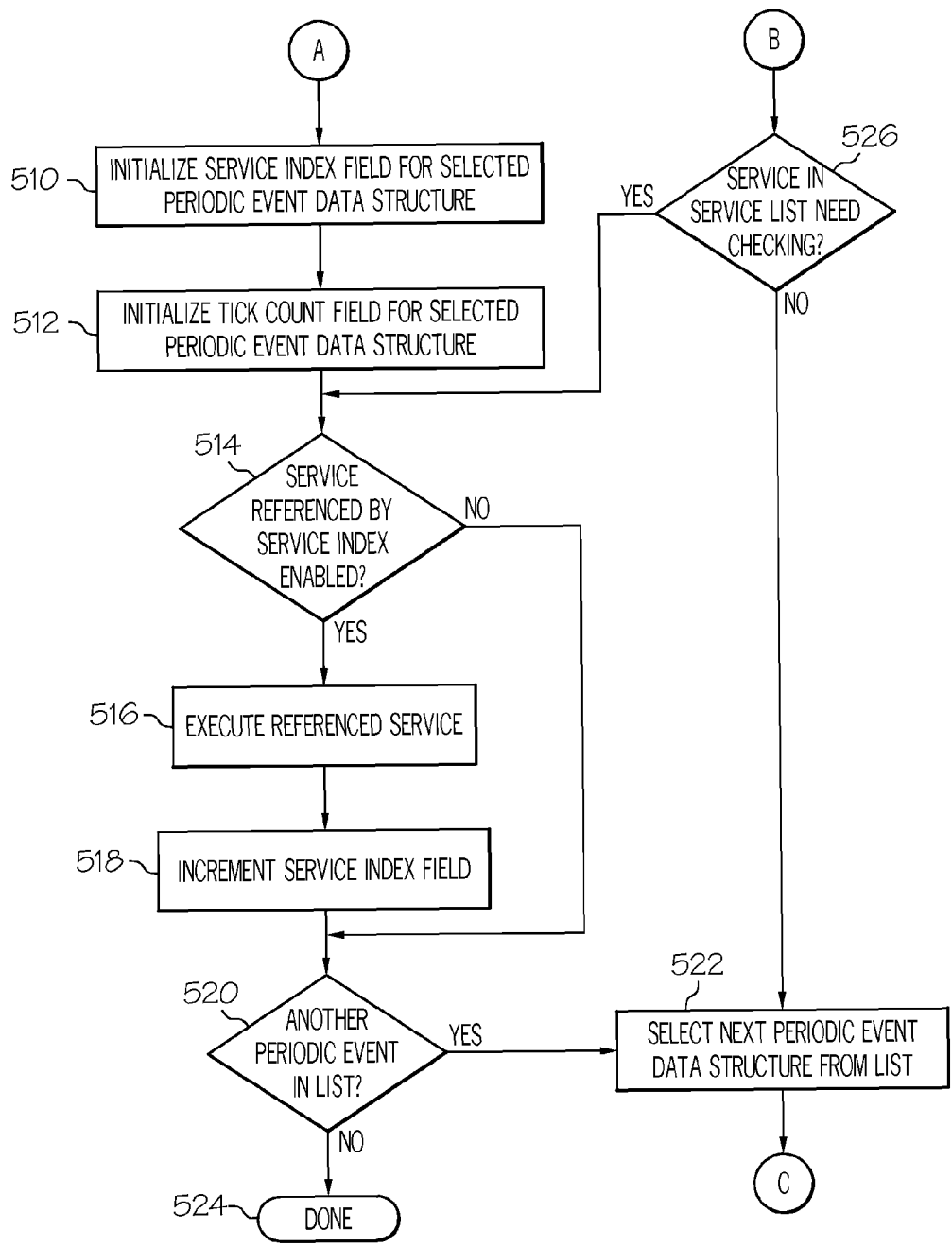

A flow diagram of one embodiment of a method 500 of scheduling periodic events is shown in FIGS. 5B-5B. Embodiments of method 500 are implemented using the data structures shown in FIGS. 4A-4B and can be implemented, for example, using the system shown in FIG. 1. When a clock tick occurs (checked in block 502 shown in FIG. 5A), the first periodic event data structure 402 is selected from the periodic event list 400 (block 504). This is done, for example where the periodic event list 400 is implemented as an array, by using an index that accesses that array.

The tick count field 406 of the selected periodic event data structure 402 is incremented (block 506). Next, it is determined if the tick count field 406 indicates that a new periodic event for the selected periodic event data structure 402 has occurred (block 508). For example, in one embodiment, the tick count field 406 indicates that a new periodic event for the selected periodic event data structure 402 has occurred if the tick count field 406 is equal to the maximum tick count field 404.

If the tick count field 406 indicates that a new periodic event for that periodic event data structure 402 has occurred, the service index field 412 is initialized to reference the first service data structure 420 in the service list 408 for the selected periodic event data structure 402 (block 510 shown in FIG. 5B). Also, the tick count field 406 for the selected periodic event data structure 402 is initialized to one (block 512). That is, the tick count field 406 is adjusted to indicate that the method is currently in the first tick of the next period following last occurrence of the periodic event associated with the selected periodic event data structure 402.

Then, it is determined if the service associated with the service data structure 420 referenced by the service index field 412 is enabled for execution (block 514). For example, this is done, in this embodiment, by checking the service state field 424 of the service data structure 420 referenced by the service index 412. If the service state field 424 contains a flag indicating that that service is enabled, then the service is executed (block 516). This is done using the service function pointer field 422 of the service data structure 420. As noted above, the service function pointer field 422 includes a pointer or other reference to a procedure or object that, when called or executed, performs the desired service. The service index field 412 is incremented so that it points to the next service data structure 420 in the service list 408 (if there are additional service data structures 420 in the service list 408) (block 518).

Next, it is determined if there are additional periodic event data structures 402 in the periodic event list 400 (block 520). If there are additional periodic event data structures 402 in the periodic event list 400, the next periodic event data structure 402 is selected (block 522). For example, on such embodiment, a index that is used to access periodic event data structures 402 from the periodic event list 400 is incremented so as to point to the next periodic event data structure 402 in the list 400. Then, method 500 loops back to block 506 shown in FIG. 5A to process the selected periodic event data structure 402 as described above. If there are no more periodic event data structures 402 in the periodic event list 400 to process, method 500 is finished (block 524 shown in FIG. 5B).

If the tick count field 406 indicates that a new periodic event for the selected periodic event data structure 402 has not occurred (block 508 shown in FIG. 5A), it is determined if there is a service in the service list 408 that needs to be checked for execution (block 526 shown in FIG. 5B). In one embodiment, the service index field 412 is compared to the number contained in the installed services field 414. If service index field 412 is less than the number of installed services (where the service index field 412 contains a zero-based index), there is a service in the service list 408 that need to be checked for execution. If that is the case, method 500 proceeds to block 514 to check if that service (that is, the service associated with the service data structure 420 referenced by the service index field 412) is enabled for execution and if it is, the service is executed during this clock tick as described above. If there are no more services in the service list 408 that need to be checked for execution, then method 500 is done with the currently selected periodic event data structure 402 and proceeds to block 520 to select the next periodic event data structure 402, if there is one, as described above.

Figure 6:
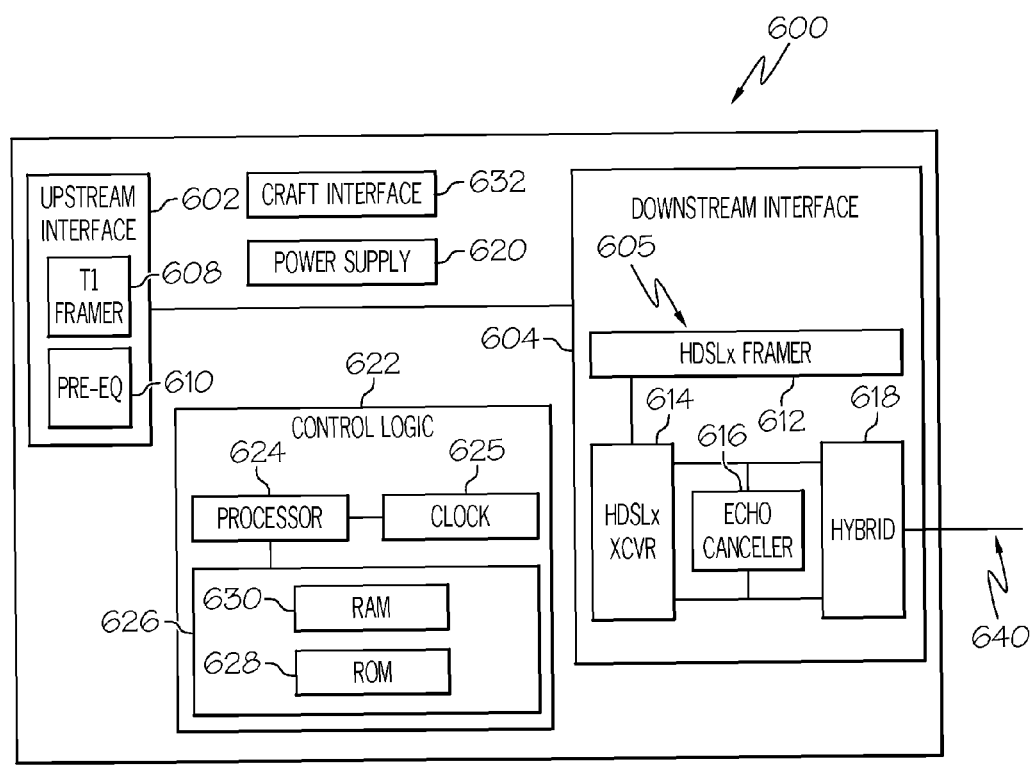
FIG. 6 is a block diagram of one embodiment of an HDSLx line interface unit.

Embodiments of the systems and methods described here can be implemented on a wide range of software and/or hardware systems. FIG. 6 is a block diagram of one embodiment of an HDSLx line interface unit 600 (also refereed to here as a "line card" 600) on which embodiments of the systems and methods described here can be implemented. HDSLx, as used herein, refers to the family of high-speed digital subscriber line (HDSL) technologies that includes, for example, HDSL, HDSL2, and HDSL4 technology. Line card 600 is used to send and receive DS1 traffic over an HDSLx communication link using one or more twisted-pair telephone lines 640 (also referred to here as "local loops" or "loops"). The line card 600 includes an upstream interface 602 and a downstream interface 604. Upstream interface 602 and downstream interface 604 couple the line card 600 to an upstream link and a downstream link, respectively. In the embodiment shown in FIG. 6, the upstream link is a DSX-1 link that is cross-connected to a time division-multiplexing network. The upstream interface 602 couples the line card 600 to the DSX-1 link and includes, for example, a T1 framer 608 and a DSX-1 pre-equalizer 610. In the embodiment shown in FIG. 6, the downstream link is an HDSLx link. The downstream interface 604 couples the line card 600 to the HDSLx link. The HDSLx link is implemented using the one or more twisted-pair telephone lines 640. The downstream interface 604 includes an HDSLx chipset 605 that includes, for example, an HDSLx framer 612 and an HDSLx transceiver 614. The downstream interface 604 also includes, for example, an echo canceller 616 and a hybrid circuit 618.

The line card 600 includes a power supply 620 for providing power to the various components of the line card 600. The line card 600 also includes control logic 622. For example, in the embodiment shown in FIG. 6, the control logic 622 includes a programmable processor 624 (such as a microprocessor) and a memory 626. Memory 626 includes, for example, both read-only memory ("ROM") 628 and random access memory ("RAM") 630. Although memory 626 is shown in FIG. 6 as having a separate ROM 628 and RAM 630, other memory configurations can be used, for example, using scratchpad memory included in the programmable processor 624. A clock 625 is also included. The clock 625 generates an interrupt for each clock tick that has elapsed. These interrupts are supplied to the programmable processor 624. In other embodiments, the mechanism that generates such clock ticks and/or interrupts is implemented in software (for example, software executing on the programmable processor 624) and/or other types of hardware.

Line card 600 also includes a craft interface 632. Craft interface 632 includes, for example, a universal asynchronous receiver-transmitter ("UART") 634 that couples an RS-232 serial port to the processor 624. A user can connect a portable computer or other data terminal to the serial port and communicate with an embedded control program executing on the programmable processor 624. Alternatively, the user can communicate with the embedded control program over an embedded operations channel carried among the DS1 traffic handled by the line card 600. Although FIG. 6 depicts an HDSLx line interface unit, other telecommunications devices can be used to implement the techniques described here. For example, G.SHDSL and asynchronous digital subscriber line (ADSL) devices can be used.

In operation, the line card 600 receives DS1 traffic from the downstream link on the downstream interface 604. The incoming DS1 traffic is formatted as HDSLx frames. The downstream interface 604 processes the incoming frames and communicates the DS1 traffic to the upstream interface 602. The upstream interface 602 formats the DS1 traffic into T1 frames and transmits the frames out on the upstream link. A similar process occurs in reverse for DS1 traffic received on the upstream interface 602 from the upstream link. The incoming DS1 traffic is formatted as T1 frames. The upstream interface 602 processes the incoming frames and communicates the DS1 traffic to the downstream interface 604. The downstream interface 604 formats the DS1 traffic into HDSLx frames and transmits the frames out on the downstream link.

In one embodiment, the systems and method described here are implemented using an embodiment of the HDSLx line card 600 by programming the programmable processor 624 so as to implement such systems and methods. Suitable program instructions and associated data structures (for example, the data structures shown in FIG. 4) are stored in memory 626. In one implementation, the program instructions are stored in ROM 628 and the data structures are stored in RAM 630. In such an embodiment, a table containing the periodic events that are processed by the line card 600 is stored in ROM 628. During system initialization, each periodic event stored in the table is registered with, for example, a control program. During this registration, the data structures shown in FIG. 4 are initialized with appropriate values for each periodic event. When interrupts are generated by the clock 625 for each clock tick, an interrupt handler executes a periodic event scheduler, which schedules execution of various services as described above.

In other embodiments, the systems and methods described here are implemented using other telecommunications devices. For example, in one such other embodiment, the system and methods described here are implemented using a shelf controller card that controls the operation of other line cards (for example, line card 600) that are housed within a common equipment shelf.

The methods and techniques described here may be implemented in digital electronic circuitry, or with a programmable processor (for example, a special-purpose processor or a general-purpose process such as a computer) firmware, software, or in combinations of them. Apparatus embodying these techniques may include appropriate input and output devices, a programmable processor, and a storage medium tangibly embodying program instructions for execution by the programmable processor. A process embodying these techniques may be performed by a programmable processor executing a program of instructions to perform desired functions by operating on input data and generating appropriate output. The techniques may advantageously be implemented in one or more programs that are executable on a programmable system including at least one programmable processor coupled to receive data and instructions from, and to transmit data and instructions to, a data storage system, at least one input device, and at least one output device. Generally, a processor will receive instructions and data from a read-only memory and/or a random access memory. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing may be supplemented by, or incorporated in, specially-designed application-specific integrated circuits (ASICs).

A number of embodiments of the invention defined by the following claims have been described. Nevertheless, it will be understood that various modifications to the described embodiments may be made without departing from the spirit and scope of the claimed invention. Accordingly, other embodiments are within the scope of the following claims.

What is claimed is:

1. A method of scheduling a plurality of periodic events, wherein each periodic event has an associated periodic interval of time and an associated set of services, the method comprising:
   configuring at least one of the set of services associated with that periodic event in a burst mode in which the service is enabled for execution a predetermined number of times and then is disabled:
   determining when one of the plurality of periodic events occurs;
   determining, for each of the set of services associated with that periodic event, if that service is enabled for execution; and
   distributing the execution of the services associated with that periodic event that are enabled throughout a next periodic interval of time associated with that periodic event following the occurrence of that periodic event.

2. The method of claim 1, wherein one of the periodic events occurs when a periodic interval of time associated with that periodic event elapses.

3. The method of claim 1, further comprising configuring at least one of the set of services associated with that periodic event in a one-shot mode in which the service is enabled for execution one time and then is disabled.

4. The method of claim 1, further comprising configuring at least one of the set of services associated with that periodic event in a continuous mode in which the service is enabled and executed continuously.

5. The method of claim 1, wherein distributing the execution of the enabled services includes executing successive enabled services on successive clock ticks following the clock tick on which that periodic event occurred.

6. A system comprising:
   a programmable processor to execute software; and
   a clock communicatively coupled to the programmable processor; and
   wherein the software executed by the programmable processor comprises:
   a periodic event scheduler that schedules a plurality of periodic events, wherein each periodic event has an associated periodic interval of time and an associated set of services;
   a tick generator that generates interrupts in response to clock ticks; and
   an interrupt handler that receives the interrupts from the tick generator and executes the periodic event scheduler in response to the interrupt;
   wherein the periodic event scheduler:
   configures at least one of the set of services associated with that periodic event in a burst mode in which the service is enabled for execution a predetermined number of times and then is disabled:
   determines when one of the plurality of periodic events occurs; and determines, for each of the set of services associated with that periodic event, if that service is enabled for execution;
   distributes the execution of the enabled services associated with that periodic event throughout a next periodic interval of time associated with that periodic event following the occurrence of that periodic event.

7. The system of claim 6, wherein one of the periodic events occurs when a periodic interval of time associated with that periodic event elapses.

8. The system of claim 6, wherein the periodic event scheduler is operable to configure at least one of the set of services associated with that periodic event in a one-shot mode in which the service is enabled for execution one time and then is disabled.

9. The system of claim 6, wherein the periodic event scheduler is operable to configure at least one of the set of services associated with that periodic event in a continuous mode in which the service is enabled and executed continuously.

10. The system of claim 6, wherein the periodic event scheduler distributes the execution of the enabled services by executing successive enabled services on successive clock ticks following the clock tick on which that periodic event occurred.

11. A telecommunication device comprising:
    an interface that couples the telecommunication device to a communication medium;
    a tick generator that generates interrupts in response to clock ticks; and control logic coupled to the interface that:
    configures at least one of the set of services associated with that periodic event in a burst mode in which the service is enabled for execution a predetermined number of times and then is disabled;
    determines when one of a plurality of periodic events occurs, wherein each periodic event has an associated periodic interval of time and an associated set of services;
    determines, for each of the set of services associated with that periodic event, if that service is enabled for execution; and
    distributes the execution of the enabled services associated with that periodic event throughout a next periodic interval of time associated with that periodic event following the occurrence of that periodic event.

12. The telecommunications device of claim 11, wherein one of the periodic events occurs when a periodic interval of time associated with that periodic event elapses.

13. The telecommunications device of claim 11, wherein the control logic is operable to configure at least one of the set of services associated with that periodic event in a one-shot mode in which the service is enabled for execution one time and then is disabled.

14. The telecommunications device of claim 11, wherein the control logic is operable to configure at least one of the set of services associated with that periodic event in a continuous mode in which the service is enabled and executed continuously.

15. The telecommunications device of claim 11, wherein the periodic event scheduler distributes the execution of the enabled services by executing successive enabled services on successive clock ticks following the clock tick on which that periodic event occurred.

* * * * *